Oct. 26, 1954 P. LLOYD 2,692,479
COMBUSTION APPARATUS FOR GAS TURBINE
PLANTS USING SLOW-BURNING FUEL
Original Filed April 9, 1948 2 Sheets-Sheet 1
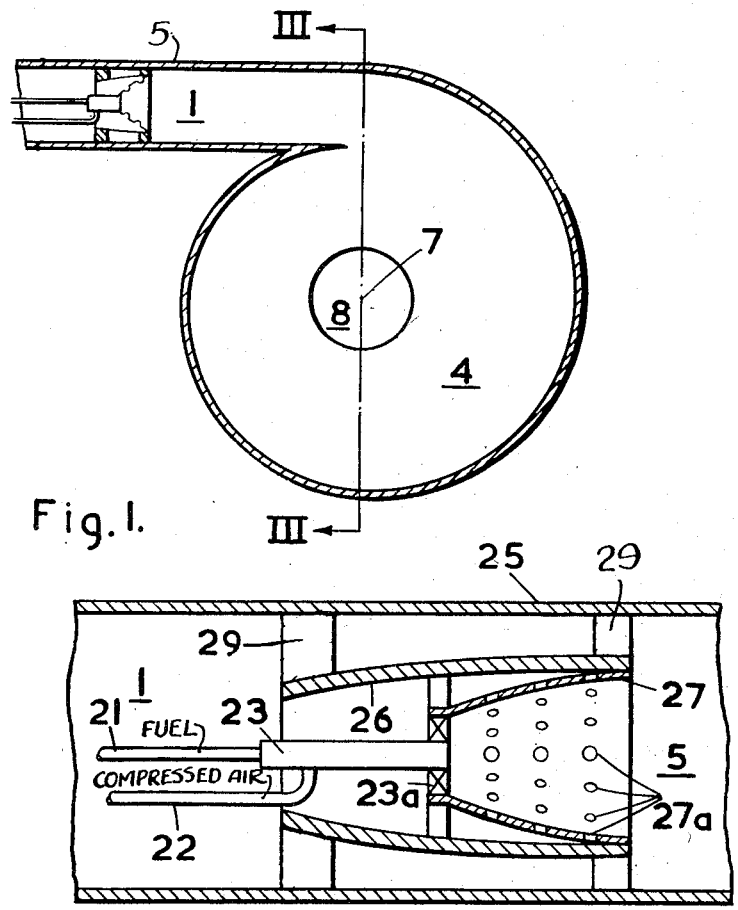
Fig. 1.
Fig. 2.
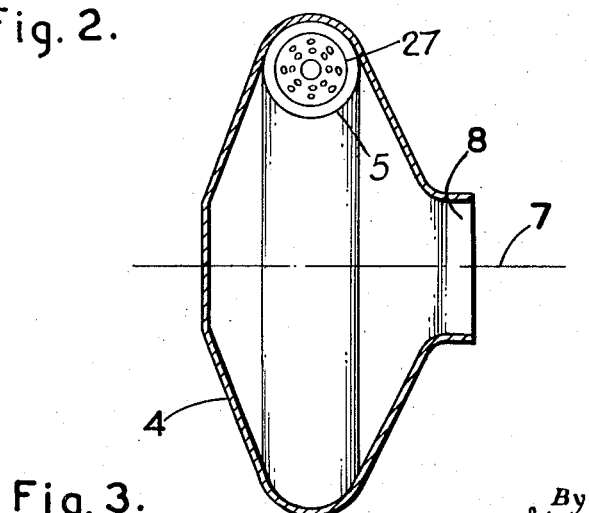
Fig. 3.
Inventor
Peter Lloyd
By Stevens, Davis, Miller & Mosher
his Attorneys Patented Oct. 26, 1954

2,692,479

UNITED STATES PATENT OFFICE 2,692,479

COMBUSTION APPARATUS FOR GAS TURBINE PLANTS USING SLOW-BURNING FUEL

Peter Lloyd, Farnham, England, assignor to Power Jets (Research and Development) Limited, London, England, a British company Original application April 9, 1948, Serial No. 20,036. Divided and this application October 10, 1951, Serial No. 250,701

Claims priority, application Great Britain April 18, 1947

3 Claims. (Cl. 60—39.65)

This invention relates to improvements in combustion systems, and is intended to be more particularly applicable for use with pulverulent solid fuel or heavy fuel oil. The present application is a division of copending United States patent application Serial No. 20,036, filed April 9, 1948.

It is known in order to facilitate the combustion of finely divided solid fuel in a fluid, to impart a vortex motion to this fluid, and to introduce the solid material into some part of the vortex.

A system is also known from British patent specification No. 338,108, for carrying out chemical and physical processes, involving interaction between fluids or between finely divided solid material and fluids, for instance, the combustion of finely divided solid fuels, in which vortex motion is imparted to a fluid, and the material between which and the said fluid interaction is to be secured is introduced into some part of the vortex in such a way that the material is suspended with either no radial velocity or comparatively low radial velocity relative to the axis of the vortex and so that the equilibrium paths of the particles of the material under the combined action of centrifugal forces and forces tending to move them towards the axis of the vortex are within the chamber in which the vortex is produced, while the fluid has a comparatively high velocity relative to the axis so as to obtain relative radial motion between the fluid and the material. Further, in accordance with this system the conditions with respect to the speed of the fluid in the vortex and the physical properties of the material introduced thereto are so related that as the reaction proceeds the material will progressively move towards the axis of the vortex; this movement occurs as the particles shrink during the reaction and take up an equilibrium path nearer the axis.

A combustion system of the character described (in the last preceding paragraph) does not in itself provide a flow pattern suitable for use in cases in which combustion has to be supported by a fast moving stream of fluid (hereinafter considered as being air), and an object of the invention is to adapt a system of the said character to the requirements of such cases. The description "fast moving" as applied to a combustion-supporting air stream is intended herein to indicate that the mean speed of the air stream in its general direction of flow past a combustion initiating zone, calculated from the ratio air volume passing in unit time/cross sectional ara of the flow path, is sufficiently high in relation to the speed of flame propagation in the fuel-air mixture concerned to have flame extinguishing properties. For hydrocarbon fuels burning in air the speed of flame propagation is considered as being of the order of one foot per second at atmospheric temperature; the invention, on the other hand, is especially applicable to combustion apparatus for internal combustion gas turbine and/or jet propulsion power units in which the speed of the air stream in its general direction of flow past a combustion zone, calculated on the basis indicated, might be from 10 to 300 feet per second or even more, depending on the design. The invention is further of particular interest in relation to installations which, in common with such power units, require stabilised burning to be supported not only by a fast moving air stream but also with high air/fuel ratios, and in which stable burning is required to be maintained at high rates of fuel injection with a minimum of pressure loss.

Accordingly the invention provides a combustion apparatus in which combustion of solid pulverulent fuel or heavy oil has to be supported in air supplied as a fast moving stream, comprising a combustion chamber in the form of a drum bounded by a peripheral wall formed with a tangentially directed air inlet and side walls, of which one is centrally apertured to define an axially directed outlet, the boundary walls thus defining a spiral vortex air path inwardly from said peripheral inlet to said central outlet, in combination with means for injecting fuel into a stable zone of combustion within said stream.

The stable zone may conveniently be formed in the tangentially directed inlet by, for example, a baffle within a flame tube enclosing a known form of fuel injector, this baffle and injector arrangement being similar to that commonly employed in gas- turbine combustion systems, except that in the present case the space enclosed by the flame tube is only long enough to initiate combustion, which cintinues around the vortex, and only primary air need enter the flame tube, additional or secondary air for combustion being supplied to the vortex.

There may be a plurality of flame tubes in one tangential inlet. There may be a plurality of tangential inlets disposed around the chamber, each containing one or more flame tubes.

Alternatively, flame stabilising means, for example in the form of baffles, may be located within the vortex path with the fuel injecting means in suitable relationship thereto.

The vortex chamber may be disposed between the compressor and the turbine and co-axial with the common shafting on which both turbine and compressor are generally mounted, outlets from the compresor being connected to the tangential inlets disposed peripherally around the vortex chamber.

As an alternative arrangement the vortex chamber may be disposed around the compressor or around the turbine or partly around both compressor and turbine, thus enabling a large combustion chamber to be provided while at the same time reducing the length of the shafting between the compressor and turbine to a minimum.

By way of example, various embodiments of the invention are described below with reference to the accompanying drawings in which:

Figure 1 is a transverse section of one embodiment;

Figure 2 is an enlarged detail of Figure 1;

Figure 3 is an axial section on the line III—III, Figure 1;

Figure 4:
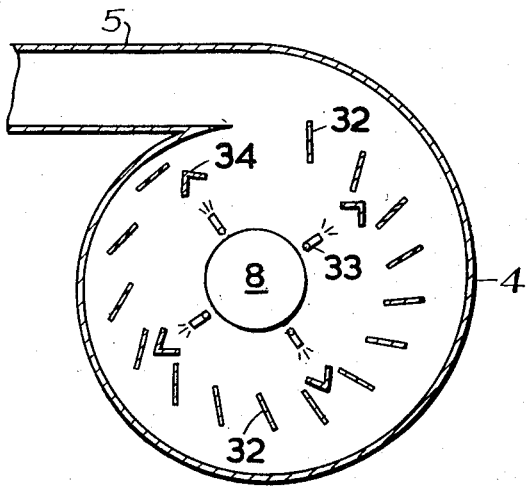
Figure 4 is a transverse section of a second embodiment.

In Figure 1, a combustion system comprises a cylindrical flame tube 1 through which is passed a fast moving air stream, as for example the delivery from the air compressor of a gas turbine engine.

The flame tube 1 within a tangentially directed inlet formed on the volute chamber 4 envelops an air blast injector 23 for burning crude liquid fuel, the term "air blast injector" meaning in this case one of the known type in which atomisation of the liqued fuel is effected by means of an air blast. In this burner liquid fuel is led through pipe 21 while compressed air is led through pipe 22 in order to atomise the fuel. The flame tube 1 forms the initial part of the combustion space, the burning gases formed therein being led through volute entry 5 into the vortex chamber 4 in which secondary combustion takes place.

Figure 2 shows the flame tube 1 on a larger scale. The air stream is delivered to an outer duct 25 and is divided by an inner co-axial duct 26 supported coaxially within the duct 25 by means of spiders 29 into two parts, the outer peripheral part passing directly into the duct 5 through the annular space between ducts 25 and 26 while the central part flows partly through swirl vanes 23A, and partly through apertures 27a in a cup shaped stabilising baffle 27 into the duct 5.

The air flowing through vanes 23a and apertures 27a constitute primary air for partial combustion of the fuel droplets ejected by the injector 23, and the burning gases produced by this primary combustion together with unburnt fuel droplets and the secondary air flowing through the annular space between ducts 25 and 26 pass through duct 5 into the vortex chamber 4 to complete combustion.

Within the chamber 4 the gases circulate around the axis 7 in vortex manner, the fuel particles while being burnt slowly approaching this axis while at the same time moving in a circular path until they are either completely burnt or a very fine ash residue remains which passes together with the combustion gases through the axial outlet 8.

The effectiveness of the combustion process in the chamber 4 depends on the range of particle sizes which it can hold in equilibrium, the ideal being a system in which very large particles can be held stable while only infinitely small particles will pass through outlet 8; as shown in Fig. 3 the walls of the chamber 4 are therefore divergent in the radially inward direction so that the central portion of the chamber 4 in the vicinity of the axis 7 is of greater axial width than the portion of the chamber near the periphery.

Figure 4 shows another form of vortex chamber according to the invention. In this case the chamber 4 is provided with a circular series of vanes 32 forming peripheral passages for the entry of air into the chamber. Four such passages each contain a baffle 34 for flame stabilisation, the fuel being radially injected outwards from the axis and towards the baffle through an equal number of radially directed pipes 33.

Figure 5:
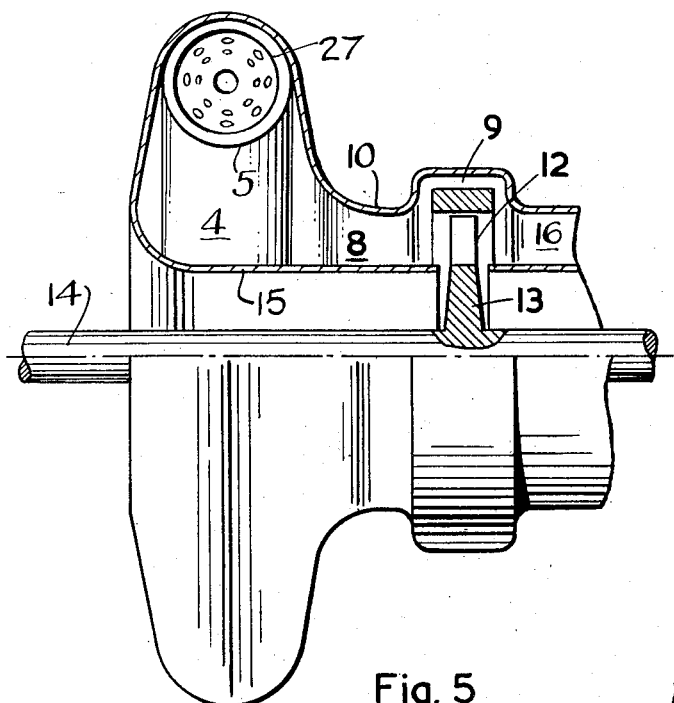
Figure 5 shows apparatus for ash removal.

In the case of a gas turbine, it is important to prevent unburnt particles from reaching the turbine blades; on the other hand the flow conditions in the chamber 4 are such that irrespective of its dimensions there will always be a critical size at which some small particles will pass through the outlet 8 where, however, they are subjected only to outward centrifugal force and drift to the periphery. Figure 5 shows a combustion chamber of the type shown in Figures 1, 2 and 3 arranged coaxially with a turbine rotor 13. The shaft 14 upon which the rotor is mounted extends through the centre of the vortex chamber 4 which is accordingly provided with a central sleeve 15 enclosing the shaft. The outlet duct 10 of the vortex chamber leads directly to the turbine blades 12. The above-mentioned particles which pass through the vortex chamber outlet 8 are removed by tapping off the boundary layer in the outlet duct 10 upstream of the turbine 13 by means of an annular passage 9 which is arranged radially outwards of the turbine blades 12 and which may if desired act as a by-pass, returning to the main exhaust gas duct 16 downstream of the turbine 13.

I claim:

1. Combustion apparatus in which combustion is supported in air supplied as a fast moving stream comprising a combustion chamber in the form of a drum having a curved wall and two end walls of which one is centrally apertured to define an axial outlet, said curved wall having a substantially tangental extension therefrom defining an air inlet duct for said stream, said drum thus defining a spiral vortex air path inwardly from said peripheral inlet to said axial outlet, in combination with means for forming a stable zone of combustion in said inlet duct and means for injecting fuel into said stable zone.

2. Combustion apparatus according to claim 1 wherein said means for forming the stable zone of combustion consist of swirlers directed to impart a helical vortex motion to the incoming air and the said fuel injection means are located to inject fuel into the core of said helical vortex.

3. Combustion apparatus in which combustion is supported in air supplied as a fast moving stream comprising a combustion chamber in the form of a drum having a curved wall and two end walls of which one is centrally apertured to define an axial outlet, said curved wall having a substantially tangential extension therefrom defining an air inlet duct for said stream, said drum thus defining a spiral vortex air path inwardly from said peripheral inlet to said axial outlet, in combination with a flame tube disposed along the interior of said inlet duct, of such length as to enclose an initial combustion space, and a fuel-injector axially disposed within said flame tube, the said tube being formed at its upstream end with air inlets disposed to admit air with a swirling motion around the tube axis.

References Cited in the file of this patent

UNITED STATES PATENTS

| Number | Name | Date |
|---|---|---|
| Re. 23,149 | Lubbock et al. | Sept. 20, 1949 |
| 578,531 | Abell | Mar. 8, 1897 |
| 1,061,469 | Gobbe | May 13, 1913 |
| 1,618,808 | Burg | Feb. 22, 1927 |
| 2,097,255 | Saha | Oct. 26, 1937 |
| 2,416,389 | Heppner et al. | Feb. 25, 1947 |
| 2,435,836 | Johnson | Feb. 10, 1948 |
| 2,458,992 | Hague | Jan. 11, 1949 |
| 2,476,507 | Parmele | July 19, 1949 |
| 2,477,683 | Birmann | Aug. 2, 1949 |
| 2,488,911 | Hepburn et al. | Nov. 22, 1949 |
| 2,499,863 | Hart | Mar. 7, 1950 |
| 2,579,614 | Ray | Dec. 25, 1951 |
| 2,601,000 | Nerad | June 17, 1952 |